US008108490B2

(12) United States Patent
Guo

(10) Patent No.: US 8,108,490 B2
(45) Date of Patent: Jan. 31, 2012

(54) RECORD/REPLAY OF USER-INPUT INSTRUCTIONS TO A WEB APPLICATION

(75) Inventor: Chao Yang Guo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 12/238,150

(22) Filed: Sep. 25, 2008

(65) Prior Publication Data

US 2009/0089404 A1 Apr. 2, 2009

(30) Foreign Application Priority Data

Sep. 28, 2007 (CN) .......................... 2007 1 0161329

(51) Int. Cl.
G06F 15/16 (2006.01)
(52) U.S. Cl. .......................... 709/219; 709/203; 709/217
(58) Field of Classification Search .......... 709/202–205, 709/217–219, 231–232
See application file for complete search history.

(56) References Cited

U.S. PATENT DOCUMENTS

| 6,535,912 | B1 * | 3/2003 | Anupam et al. ............... 709/219 |
| 7,316,033 | B2 * | 1/2008 | Risan et al. ................... 709/231 |
| 7,529,798 | B2 * | 5/2009 | Rust ............................... 709/217 |
| 7,552,199 | B2 * | 6/2009 | Pomerantz ..................... 709/219 |
| 7,970,857 | B2 * | 6/2011 | Schneider ...................... 709/219 |
| 2005/0132232 | A1 * | 6/2005 | Sima .............................. 713/201 |
| 2008/0177824 | A1 * | 7/2008 | Wang et al. .................... 709/203 |
| 2008/0288581 | A1 * | 11/2008 | Schneider ...................... 709/203 |

FOREIGN PATENT DOCUMENTS

CN 1347036 A 5/2002

* cited by examiner

Primary Examiner — Bharat Barot
(74) Attorney, Agent, or Firm — Jeanine S. Ray-Yarletts; Law Office of Jim Boice

(57) ABSTRACT

This Invention provides a system which enables recording/replaying Web-based user steps including a client and a server, wherein the server includes: Web Application means for displaying Web interface for the client, where user's actions on web interface form said Web-based user steps; A recorder/player which is set in front of the Web application means for recording said Web-based user steps and enables replaying the recorded user steps; the storage means for storing the Web-based user steps recorded in recorder/player. This invention also provides a related Server, recorder/player and method. With this invention, the user steps can be easily recorded and replayed in the browser without any help from other installation programs and thus can be shared by other users.

16 Claims, 7 Drawing Sheets

RECORD/REPLAY OF USER-INPUT INSTRUCTIONS TO A WEB APPLICATION

TECHNICAL FIELD

The present Invention relates to an Internet application field, especially to a system, recorder/player and related method for recording/replaying the web-based user steps.

BACKGROUND TECHNOLOGY

Currently most commercial/personal applications are based on Web technology, such as a console of a Web Sphere application server, an E-bank website, a B2B website, G-mail, etc.

A Web-based Application has a large number of functions, while most of the users only use part of them. Moreover, the user will find that most user steps are repetitive when the user is executing some steps in Web-based applications to fulfill specific functions. The user hopes that such repetitive steps can be completed automatically on the website so as to improve efficiency and enable other users to share some repetitive steps easily.

For instance, in the prior art, WebSphere administrators often open/close JAVA GC (Garbage Collection) to collect any information related to a JAVA heap.

Currently Administrators must take following actions to open the garbage collection function:
1) Entering a user name and a password on a logon page of a WebSphere console;
2) On the console of the WebSphere application server, activating a "server" link and then activating an "Application Server" link;
3) On Application Server page, activating a "Server 1" link;
4) On Server 1 page, activating a "Java and Process Control" link, and then activating a "Process Definition" link;
5) On the Process Definition page, activating a "Java Virtual Machine" link;
6) On the Java Virtual Machine page, activating a "Run Time" link;
7) On Run Time page, selecting checkbox "Garbage Collection Detail" and then activating confirmation button.

Every time when opening the Garbage Collection, the process to be executed is the same as above, and thus time is seriously wasted and efficiency reduced. A method and device for automatically executing above steps is in need.

Currently Web Sphere Administrators need master JACL/JYTHON programming language skill. Thus they can write automatic tasks to execute above steps automatically. Therefore, Web Sphere Administrators expect to have an "Activate and Record" solution to record and replay all steps easily on the browsers. And, they do not expect to install any other applications such as LoadRunner. Here is another example. In this example, the user logs on the same B2C website every month to buy the same type of IP card. And the user is required to execute the steps as follows on each logon:
1) Entering a user name/password on the logon page of such website;
2) activating the "Card Type" link on the home page;
3) activating the "phone card" link on the "Type" page;
4) activating the link of card name the user would like to buy on the "phone card" page;
5) activating "Buy It" link on the card page;
6) entering credit card information and activating "Buy It" button on the "Pay" page;
7) Finding detailed card information (account number, password and so on) on the "Result" page.

The user expects to have an "activate and record" solution to record above steps 1)-5) for the user, so that every time when buying a card only one button is required to activate on web page, which will direct the user to the "Pay" page and let the user input credit card information and give a result. Moreover, the user does not expect to install any auxiliary tools, such as LoadRunner.

So in the prior art a method and device which can record and replay the user steps on browser without any other installation programs are needed.

In addition, in the prior art, there is a demand of allowing others to share recorded user steps.

Some functions in Web-based commercial applications have a lot of complicated and repetitive steps.

For example during the stage of application test and deployment, the deployed J2EE application will frequently access some related configuration pages on Web-based Console such as WebSphere Console, and execute some steps repetitively.

Currently WebSphere application developers can use some script languages such as Jacl/Jython for developing automatic deployment script for deployment steps executed on Web-based console. Furthermore, these developers expect to share such script with Web Sphere application testers for repeating these steps.

If these developers enable such steps recorded to be easily shared by other users, others can easily repeat such steps without any auxiliary application such as Load Runner/RPT, which will be greatly beneficial.

SUMMARY OF INVENTION

In view of what is mentioned above, one purpose of this invention is to provide a system, a recorder/player and a method for recording and replaying user steps in the browser, which can be used by common end users without the help from any other installation program.

Another purpose of this invention is to provide a system, a recorder/player and a method for recording some user steps to be shared by other users.

The present invention provides a system which enables recording/replaying Web-based user steps at a server side including a client and a server, wherein the server includes: Web application means for displaying a Web interface for a client, wherein user's actions on the web interface form said Web-based user steps; a recorder/player which is set in front of the Web Application for recording said Web-based user steps and enabling replaying the recorded user steps; storage means for storing the Web-based user steps recorded in the recorder/player.

According to one aspect of the present invention, the recorder/player starts recording the Web-based user steps in response to a first event, and stops recording the Web-based user steps in response to a second event.

According to one aspect of the present invention, the Web application means enables the interface displayed on the client to contain "Begin to Record" button, and said first event is user's activating "Begin to Record" button.

According to one aspect of the present invention, the recorder/player records requests from the client subsequent to the request due to the first event sent by the client after receiving the request due to the first event sent by the client until receiving the request due to the second event sent by the client; the recorder/player also transmits the request sent from the client to the Web Application means and records a response of the Web Application means in correspondence with the request sent by the client.

According to one aspect of the present invention, the recorder/player creates a record object and records the request sent by the client subsequent to the request due to the first event sent by the client and a corresponding response of the Web Application means in the record object, and records the content of the record object into the storage means when receiving the request due to the second event sent by the client.

According to one aspect of the present invention, after the recorder/player finishes recording the user steps, the Web application means enable an interface to be displayed at the client for entering a name for a file which the recorded user steps are saved as.

According to one aspect of the present invention, the Web application means displays to the client the name list of files as which the previously recorded user steps are saved stored in the storage means, the recorder/player fetches the stored request in turn from the file corresponding to selected file name in the storage means in response to user's selection in displayed name list of files, sends these Requests in turn to the Web application means, and then returns the processed result from the Web application means back to the client.

According to one aspect of the present invention, the recorder/player compares the response as the processed result from the Web application means with the response stored in the file corresponding to the selected file name, and returns a comparing result indicating whether the processed result is the same with user's expected result back to the client.

According to one aspect of the present invention, in response to user's selection in the displayed name list of files, the Web application means returns an interface for prompting the user to enter a user name and a password back to the client, compares the user name and password which the user inputs on the interface with the user name and password saved in the stored files corresponding to the selected file name, and replays for the user only when the user names and passwords are consistent.

According to one aspect of the present invention, the second event differs based on following different circumstances: a. the Web application means enable the interface displayed on the client to include "Stop Recording" Button, and in this case said second event is user's activating "Stop Recording" Button; b. in response to user's activating "Begin to Record" button, the Web application means inquires on the interface displayed on the client the user of how many user steps to be proceeded will be recorded, returns the interface back to the client informing the user that the number to be recorded of user steps have been recorded and inquiring of the user whether to continue recording subsequent steps when recording of the number input by the user of user steps is completed; c. in response to user's activating "Begin to Record" button, the Web application means display the query interface on the client inquiring of the user the time span after the user activates the "Begin to Record" button all the user steps will be recorded, return an interface to the client at the end of the time span which the user has entered informing the user that the time span entered by the user has completed and inquiring whether the user wishes to continue recording subsequent steps, and in this case said second event is user's selection of discontinuing to record subsequent steps; or d. in response to user's activating "Begin to Record" button, the recorder/ player begins to record subsequent user steps; in response to user's pausing at preset time interval not executing any user steps, the Web application means return an interface to the client and inquire the user of whether the user wishes to save the currently recorded user steps as a file, and in this case said second event is user's selection of wishing to save the currently recorded user steps as a file.

According to one aspect of the present invention, the Web application means classify and display the name list as per the file creator's user name or the category of the file when displaying the name list of files as which the user steps recorded by the recorder/player are saved to the client, where the category of the file can be entered on the interface at the same time with entering the name for the file as which the recorded user steps are saved.

According to one aspect of the present invention, the Web application means sort and display the name list of files as which the user steps previously recorded by the recorder/ player are saved as per the frequency of the files being replayed previously when displaying the name list to the client.

According to one aspect of the present invention, the Web application means display at the client an interface for the user's viewing the files as which the recorded user steps are saved, said files being editable on such interface, several files as which the recorded user steps are saved being integratable into one file at the interface.

The present invention further provides a recorder/player, which is installed in front of the Web application means of the server in a form of plug-in and coupled to storage means for recording to the storage means Web-based user steps formed by user's action on the Web interface and enables replaying the recorded user steps, comprising: a request data line for transmitting the request from the client to the Web application means; a response data line for transmitting the response from Web application means to the client; controller means for coupling to the request data line and the response data line respectively, having a "Begin to Record" triggering end and a "Stop Recording" triggering end, which begin to record the request on the request data line from the client and the response on the response data line from the Web application means when the first event triggering is input on the "Begin to Record" triggering end and stop recording the request on the request data line from the client and the response on the response data line from the Web application means when the second event triggering is input on "Stop Recording" triggering end; wherein the controller means have a reproduction triggering end, obtain the corresponding recorded user steps file from the storage means when reproduction trigger is input on the reproduction triggering end, transmit the request from the client recorded in the file to the request data line for sending to the Web application means.

According to one aspect of the present invention, the Web application means enable the interface displayed on the client to include "Begin to Record" button, said first event being the user's activating "Begin to Record" button; the Web application means enable the interface displayed on the client to include "Stopping Record" button, said second event being the user's activating "Stopping Record" button.

According to one aspect of the present invention, a record object is created, the request sent by the client subsequent to the first event trigger and a corresponding response of the Web application means are recorded in the record object when the first event trigger is input by the "Begin to Record" triggering end, and the content of the record object is recorded in a form of file into the storage means when the second event trigger is input by the "Stop Recording" triggering end.

According to one aspect of the present invention, the recorder/player according to the present invention further comprises comparer means, and after the controller means transmits the request from the client recorded in the recorded user steps files corresponding to the reproduction trigger to the request data line for sending to the Web application means, the controller means acquire from the response data line the response of processing result from the Web application means, and the comparer means compare said response with the response recorded in the corresponding recorded user steps file, and then return the comparison result indicating whether the processing result is the same with the user's expected result back to the client.

The present invention also provides a server method for recording Web-based user steps comprising: displaying Web interface to the client, wherein user's actions on the Web interface forms Web-based user steps; in response to the user's action on the Web interface, the Web-based user steps formed by user's actions on the Web interface are recorded on the server side.

According to one aspect of the present invention, the name list for files as which the previously recorded user steps are saved is displayed to the client; in response to the user's selection in the displayed name list of files, the stored requests are fetched in turn from the file corresponding to the selected file name, these requests are subject to the Web application processing, and the Web application processed processing result is returned to the client.

According to one aspect of the present invention, the interface displayed on the client is enabled to contain a "Begin to Record" button, and recording Web-based user steps is begun in response to the user's activating "Begin to Record" button; and the interface displayed on the client is enabled to contain a "Stop Recording" button and recording Web-based user steps is stopped in response to the user's activating "Stop Recording" Button.

According to one aspect of the present invention, after the server receives the request sent by the client due to the user's activating the "Begin to Record" button, the server records the requests sent from the client after this request, transmits the requests sent from the client after this request to the Web application on the server side, and record the response from the Web application in correspondence with the request from the client, until receiving the request sent by the client due to user's activating the "Stop Recording" button.

According to one aspect of the present invention, the response as the processing result processed by the Web application and the one stored on the server side are compared, and the result of comparison indicating whether the processed result is the same with user's expected result is returned back to the client.

With the abovementioned technology, when the user activates the "Begin to Record" Button, the recorder/player will begin to record user steps on the Server-side till the user activates "Stop Recording" Button or the number of user steps input by the user in advance have been completed, or the period of time the user input in advance has elapsed, etc. Upon recording the user enables selecting any one of the files as which the user steps recorded previously are recorded for replay by means of activating "Replay" Button. In this way, without any help from other installation program, the user steps can be recorded and replayed in the browser, and shared by other users so as to avoid any low efficiency caused by repeating repetitive steps.

The user steps recorded will be packed into a file with only one name. The user can edit all files recorded and let others share them. Others can easily replay the user steps in such file in Web Page.

DESCRIPTION OF PREFERRED EMBODIMENT

Embodiment 1

Figure 1:
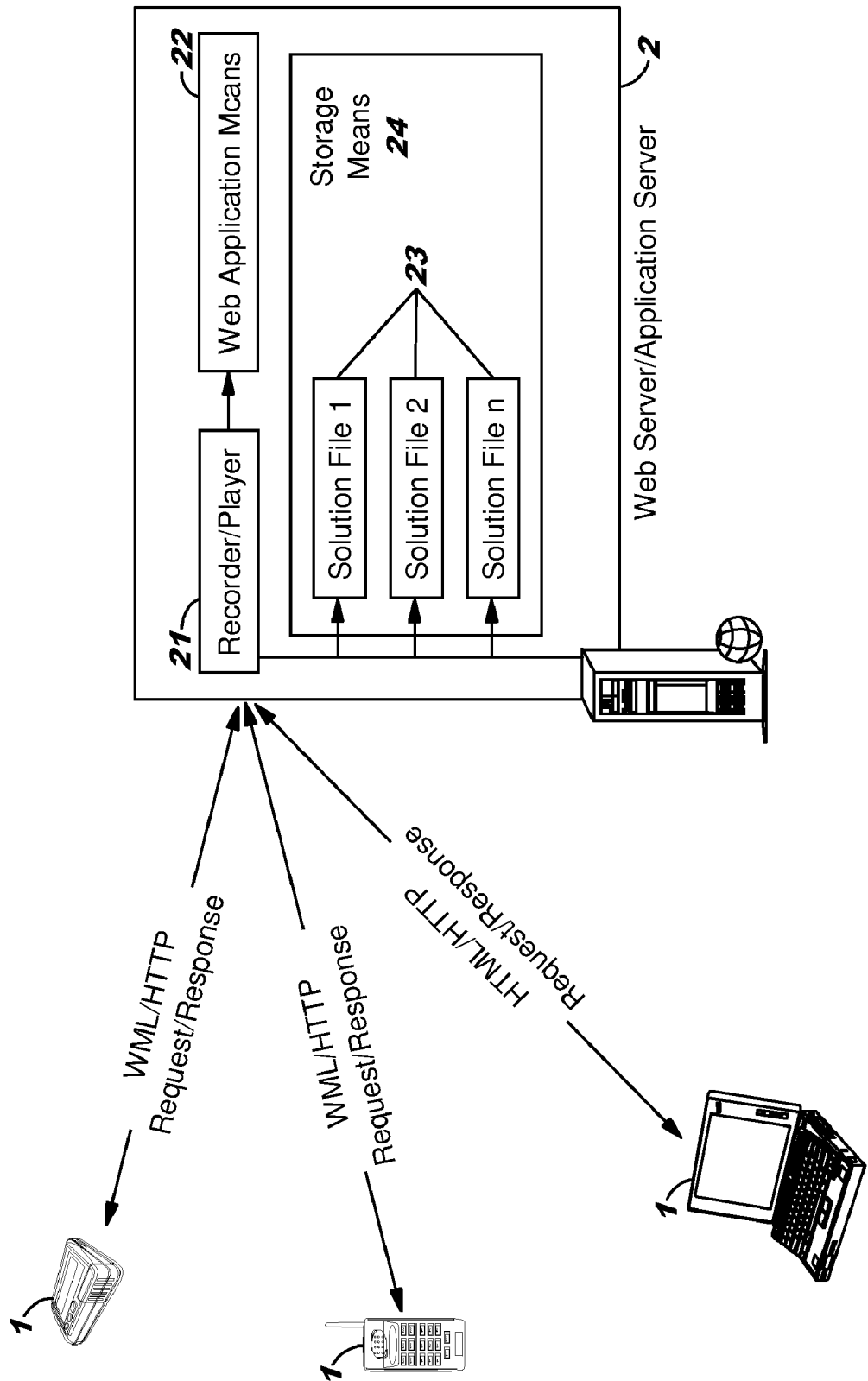
FIG. 1 is a Structural Block Diagram of System which is able to record/replay Web-based user steps according to this Invention.

FIG. 1 is a Structural Block Diagram of System which is able to record/replay Web-based user steps according to this Invention. The system shown in FIG. 1 consists of Client (1) and Server (2). The Client can be in any form capable of enabling web function. Three forms, personal digit assistant (PDA), mobile phone and computer are shown in FIG. 1; however, any other possible forms are also not excluded. The Server (2) includes Web Application (22) (mainly modular web application), Recorder/Player (21), Storage means (24) for storing Solution Files 1 . . . n (23). There are three solution files that are shown in FIG. 1, but other possible number is also available.

In this Invention, a Recorder/Player, as an independent plug-in being plugged in front of Web Application (22), can be sold as a single product. This Invention is realized by plugging such invented recorder/player plug-in into the universal server and appropriately improving Web Application (22) to enable the display on the Client to include such interfaces as "Begin to Record" button and "Stop Recording" button.

Here are examples for abovementioned garbage collection to describe a detailed process of this Invention.

The Web Application (22) shown in FIG. 1 enables interface on the Client to display "Begin to Record" button and "Stop Recording" button which are simple HTML buttons. For example they can be set on top left or top right of screen, and have no effect on the normal field of vision for the user to view the garbage collection under this example. The user will request Server to enable "Begin to Record" or "Finish Recording" user steps through these buttons. To enable the garbage collection function, the user shall log on "Logon Page" of Web Sphere admin console first, then "Logon Page" will prompt the user to enter the user name and password. As the user wants to record a series of garbage collection steps for replay, thus to provide convenience for future garbage collection, the user is in no hurry to fill in the user name and password, but activate "Begin to Record" button (e.g. activate with Mouse or click with keyboard) on the Page, and just at that time the Client (1) will automatically send the Request with "Begin to Record" message to Recorder/Player (21) on Server-side (Client has such automatic function), then Recorder/Player (21) begins to work and is ready to record the subsequent user steps to be taken by the user on such Client. It will send a "Ready" signal to the Client through a Response, and get ready to record the subsequent user steps to be taken by the user on such Client. It will create Record Object and place it in the record list in the memory of Recorder/Player (21). Every step to be executed by the user on web-based application corresponds to a "send" request. Once the user executes a user step, Client will send the corresponding request to Recorder/Player (21) which will take Record Object from the record list and add such request to Record Object. Recorder/Player (21) will retake Record Object if receiving another request corresponding to the user steps, and then add such request to Record Object, and send these requests to Web Application (22) for processing, result of which (i.e. response of Web Application (22) will be added to Record Object correspondingly with the request, and such response will also be returned to the Client. To be specific:

1) The User ZHANG SAN enters his user name "ZHANG SAN" and password "ABC" on Logon Page of Web Sphere admin console, and at that time the Client will send corresponding request to the Recorder/Player (21). Such request shall contain the message of user name "ZHANG SAN" and password "ABC" and shall be recorded to Record Object by Recorder/Player (21), which then will send such request to Web Application means (22). And the response code sequence as the processed result by Web Application means (22) will also be added to Record Object. Therefore, in this step what is recorded to Record Object shall be:

It is seen from abovementioned that the contents recorded include two parts: one is the Client request; the other is response from Server. The user name and password are contained in the Client request.

As the processed result by Web Application means (22), Web Application means (22) will display a homepage on the Client interface; however, such homepage consists of three parts as viewed from Browser on the Client. So Browser will further request homepage-related three subpage information

```
--CLIENT REQUEST------------------------------------------------------------------------
POST /ibm/console/login.do HTTP/1.1
Host: 9.186.117.207:9060
User-Agent: Mozilla/5.0 (Windows; U; Windows NT 5.1; zh-CN; rv:1.8.1.6) Gecko/20070725
Firefox/2.0.0.6
Accept:
application/x-shockwave-flash,text/xml,application/xml,application/xhtml+xml,text/html;q=0.9,te
xt/plain;q=0.8,image/png,*/*;q=0.5
Accept-Language: en-us,zh-cn;q=0.5
Accept-Encoding: gzip,deflate
Accept-Charset: gb2312,utf-8;q=0.7,*;q=0.7
Keep-Alive: 300
Connection: keep-alive
Referer: http://9.186.117.207:9060/ibm/console/logout.do
Cookie: JSESSIONID=0000rnhAZow1ZCE2IIhhMDH4Qhx:-1; TJE=; TE3=
Content-Type: application/x-www-form-urlencoded
Content-Length: 28
username=admin&submit=Log+in
--SERVER RESPONSE---------------------------------------------------------------------
HTTP/1.x 200 OK
Content-Type: text/html; charset=UTF-8
Content-Language: en-US
Transfer-Encoding: chunked
Date: Tue, 28 Aug 2007 04:58:43 GMT
Server: WebSphere Application Server/6.1
``` from Server automatically. The followings are request and response for above three subpage information. Recorder/Player (21), just like what is mentioned above, will record them to Record Object:

```
-- CLIENT REQUEST --------------------------------------------------------------------
GET /ibm/console/secure/isclite/tiles/bannerframe.jsp HTTP/1.1
Host: 9.186.117.207:9060
User-Agent: Mozilla/5.0 (Windows; U; Windows NT 5.1; zh-CN; rv:1.8.1.6)
Gecko/20070725 Firefox/2.0.0.6
Accept;
application/x-shockwave-flash,text/xml,application/xml,application/xhtml+xml,text/html;q=
0.9,text/plain;q=0.8,image/png,*/*;q=0.5
Accept-Language: en-us,zh-cn;q=0.5
Accept-Encoding: gzip,deflate
Accept-Charset: gb2312,utf-8;q=0.7,*;q=0.7
Keep-Alive: 300
Connection: keep-alive
Referer: http://9.186.117.207:9060/ibm/console/login.do
Cookie: JSESSIONID=0000rnhAZow1ZCE2IIhhMDH4Qhx:-1; TJE=; TE3=
-- SERVER RESPONSE-------------------------------------------------------------------
HTTP/1.x 200 OK
Content-Type: text/html; charset=UTF-8
Content-Language: en-US
Transfer-Encoding: chunked
Date: Tue, 28 Aug 2007 04:58:43 GMT
Server: WebSphere Application Server/6.1
```

---

--CLIENT REQUEST -------------------------------------------------------------------------------
GET /ibm/console/nsc.do HTTP1.1
Host: 9.186.117.207:9060
User-Agent: Mozilla/5.0 (Windows; U; Windows NT 5.1; zh-CN; rv:1.8.1.6) Gecko/20070725 Firefox/2.0.0.6
Accept: application/x-shockwave-flash,text/xml,application/xml,application/xhtml+xml,text/html;q=0.9,text/plain;q=0.8,image/png,*/*;q=0.5
Accept-Language: en-us,zh-cn;q=0.5
Accept-Encoding: gzip,deflate
Accept-Charset: gb2312,utf-8;q=0.7,*;q=0.7
Keep-Alive: 300
Connection: keep-alive
Referer: http://9.186.117.207:9060/ibm/console/login.do
Cookie: JSESSIONID=0000rnhAZow1ZCE2IIhhMDH4Qhx:-1; TJE=; TE3=
-- SERVER RESPONSE --------------------------------------------------------------------
HTTP/1.x 200 OK
Content-Type: text/html; charset=ISO-8859-1
Content-Language: en-US
Transfer-Encoding: chunked
Date: Tue, 28 Aug 2007 04:58:43 GMT
Server: WebSphere Application Server/6.1

---

-- CLIENT REQUEST -------------------------------------------------------------------
GET /ibm/console/navigation.do?wpageid=com.ibm.isclite.welcomeportlet.layoutElement.A&moduleRef=com.ibm.isclite.ISCAdminPortlet HTTP/1.1
Host: 9.186.117.207:9060
User-Agent: Mozilla/5.0 (Windows; U; Windows NT 5.1; zh-CN; rv:1.8.1.6) Gecko/20070725 Firefox/2.0.0.6
Accept: application/x-shockwave-flash,text/xml,application/xml,application/xhtml+xml,text/html;q=0.9,text/plain;q=0.8,image/png,*/*;q=0.5
Accept-Language: en-us,zh-cn;q=0.5
Accept-Encoding: gzip,deflate
Accept-Charset: gb2312,utf-8;q=0.7,*;q=0.7
Keep-Alive: 300
Connection: keep-alive
Referer: http://9.186.117.207:9060/ibm/console/login.do
Cookie: JSESSIONID=0000rnhAZow1ZCE2IIhhMDH4Qhx:-1; TJE=; TE3=
-- SERVER RESPONSE ---------------------------------------------------------------------
HTTP/1.x 200 OK
Content-Type: text/html; charset=ISO-8859-1
Content-Language: en-US
Transfer-Encoding: chunked
Date: Tue, 28 Aug 2007 04:58:43 GMT
Server: WebSphere Application Server/6.1

---

2) Then, the User ZHANG SAN activates "Application Server" link on the interface displayed on the Client with Web Application means (22), i.e. Interface of Web Sphere application server admin console, and at the same time the Client will send corresponding request to Recorder/Player (21), and such request contains URL (Uniform Resource Locator) of the "Application Server" link activated by ZHANG SAN and relevant data of such two links. Recorder/Player (21) will add such request to Record Object, and then send such request to Web Application means (22). The response code sequence as the processed result by Web Application means (22) will be added to Record Object. So in this step, the following request and response will be recorded to Record Object.

---

-- CLIENT REQUEST -------------------------------------------------------------------------------
GET /ibm/console/navigatorCmd.do?forwardName=ApplicationServer.content.main HTTP/1.1
Host: 9.186.117.207:9060
User-Agent: Mozilla/5.0 (Windows; U; Windows NT 5.1; zh-CN; rv:1.8.1.6) Gecko/20070725 Firefox/2.0.0.6
Accept: application/x-shockwave-flash,text/xml,application/xml,application/xhtml+xml,text/html;q=0.9,text/plain;q=0.8,image/png,*/*;q=0.5
Accept-Language: en-us,zh-cn;q=0.5
Accept-Encoding: gzip,deflate
Accept-Charset: gb2312,utf-8;q=0.7,*;q=0.7
Keep-Alive: 300

```
Connection: keep-alive
Referer: http://9.186.117.207:9060/ibm/console/login.do
Cookie: JSESSIONID=0000rnhAZow1ZCE2IIhhMDH4Qhx:-1; TJE=; TE3=N0:C N1:E N2:C
N3:C N4:C N5:C N6:C N7:C N8:C N9:C N10:C N11:C N12:C N13:C N14:C N15:C N16:C N17:C
N18:C N19:C N20:C N21:C N22:C N23:C N24:C N25:C
-- SERVER RESPONSE ------------------------------------------------------------------------
HTTP/1.x 200 OK
Content-Type: text/html; charset=ISO-8859-1
Content-Language: en-US
Transfer-Encoding: chunked
Date: Tue, 28 Aug 2007 04:58:43 GMT
Server: WebSphere Application Server/6.1
HTTP/1.x 200 OK
Content-Type: text/html; charset=ISO-8859-1
Content-Language: en-US
Transfer-Encoding: chunked
Date: Tue, 28 Aug 2007 05:15:41 GMT
Server: WebSphere Application Server/6.1
``` wherein the abovementioned Client request contains URL and parameter information of "Application Server" link.

3) Then, the User ZHANG SAN activates "Server 1" link on the interface displayed on the Client with Web Application means (22), i.e. Interface of Application Server page, and at the same time the Client will send corresponding request to Recorder/Player (21), and such request contains URL (Uniform Resource Locator) of the "Application Server" link activated by ZHANG SAN and relevant parameter of such link. Recorder/Player (21) will add such request to Record Object, and then send such request to Web Application means (22). The response code sequence as the processed result by Web Application means (22) will be added to Record Object. So in this step, what is recorded to Record Object shall be:

wherein the recorded Client request contains URL and parameter information of "Server 1" link.

4) Then, the User ZHANG SAN activates "Process Definition" link on the interface displayed on the Client with Web Application means (22), i.e. Interface of Server 1 page, and at the same time the Client will send corresponding request to Recorder/Player (21), and such request contains URL (Uniform Resource Locator) of "Process Definition" link activated by ZHANG SAN and relevant parameter of such link. Recorder/Player (21) will add such request to Record Object, and then send such request to Web Application means (22). The response code sequence as the processed result by Web Application means (22) will be added to Record Object. So in this step, what is recorded to Record Object shall be:

```
-- CLIENT REQUEST ------------------------------------------------------------
GET
/ibm/console/applicationServerCollection.do?EditAction=true&contextId=cells%3AIBM-BAC3A
901240Node01Cell%3Anodes%3AIBM-BAC3A901240Node01%3Aservers%3Aserver1&resourc
eUri=server.xml&perspective=tab.configuration HTTP/1.1
Host: 9.186.117.207:9060
User-Agent: Mozilla/5.0 (Windows; U; Windows NT 5.1; zh-CN; rv:1.8.1.6) Gecko/20070725
Firefox/2.0.0.6
Accept:
application/x-shockwave-flash,text/xml,application/xml,application/xhtml+xml,text/html;q=0.9,te
xt/plain;q=0.8,image/png,*/*;q=0.5
Accept-Language: en-us,zh-cn;q=0.5
Accept-Encoding: gzip,deflate
Accept-Charset: gb2312,utf-8;q=0.7,*;q=0.7
Keep-Alive: 300
Connection: keep-alive
Referer:
http://9.186.117.207:9060/ibm/console/navigatorCmd.do?forwardName=ApplicationServer.conten
t.main
Cookie: JSESSIONID=0000rnhAZow1ZCE2IIhhMDH4Qhx:-1; TJE=; TE3=N0:C N1:E N2:C
N3:C N4:C N5:C N6:C N7:C N8:C N9:C N10:C N11:C N12:C N13:C N14:C N15:C N16:C
N17:C N18:C N19:C N20:C N21:C N22:C N23:C N24:C N25:C
-- SERVER RESPONSE ------------------------------------------------------------
HTTP/1.x 200 OK
Content-Type: text/html; charset=ISO-8859-1
Content-Language: en-US
Transfer-Encoding: chunked
Date: Tue, 28 Aug 2007 05:18:02 GMT
Server: WebSphere Application Server/6.1
```

```
-- CLIENT REQUEST --------------------------------------------------------------------------
GET
/ibm/console/com.ibm.ws.console.servermanagement.forwardCmd.do?forwardName=ProcessDef.c
onfig.view&sfname=processDefinitions&lastPage=ApplicationServer.config.view&resourceUri=ser
ver.xml&parentRefId=ApplicationServer_1188209145281&serverRefId=Server_1188209145281&
contextId=cells%3AIBM-BAC3A901240Node01Cell%3Anodes%3AIBM-BAC3A901240Node01
%3Aservers%3Aserver1&perspective=tab.configuration HTTP/1.1
Host: 9.186.117.207:9060
User-Agent: Mozilla/5.0 (Windows; U; Windows NT 5.1; zh-CN; rv:1.8.1.6) Gecko/20070725
Firefox/2.0.0.6
Accept:
application/x-shockwave-flash,text/xml,application/xml,application/xhtml+xml,text/html;q=0.9,text
/plain;q=0.8,image/png,*/*;q=0.5
Accept-Language: en-us,zh-cn;q=0.5
Accept-Encoding: gzip,deflate
Accept-Charset: gb2312,utf-8;q=0.7,*;q=0.7
Keep-Alive: 300
Connection: keep-alive
Referer:
http://9.186.117.207:9060/ibm/console/applicationServerCollection.do?EditAction=true&contextId
=cells%3AIBM-BAC3A901240Node01Cell%3Anodes%3AIBM-BAC3A901240Node01%3Aserve
rs%3Aserver1&resourceUri=server.xml&perspective=tab.configuration
Cookie: JSESSIONID=0000rnhAZow1ZCE2IIhhMDH4Qhx:-1; TJE=; TE3=N0:C N1:E N2:C
N3:C N4:C N5:C N6:C N7:C N8:C N9:C N10:C N11:C N12:C N13:C N14:C N15:C N16:C N17:C
N18:C N19:C N20:C N21:C N22:C N23:C N24:C N25:C
-- SERVER RESPONSE --------------------------------------------------------------------------
HTTP/1.x 200 OK
Content-Type: text/html; charset=ISO-8859-1
Content-Language: en-US
Transfer-Encoding: chunked
Date: Tue, 28 Aug 2007 05:20:39 GMT
Server: WebSphere Application Server/6.1
``` wherein the recorded Client request contains URL and parameter information of "Process Definition" link.

5) Then, the User ZHANG SAN activates "Java Virtual Machine" link on the interface displayed on the Client with Web Application means (22), i.e. Interface of Process Definition page, and at the same time the Client will send corresponding request to Recorder/Player (21), and such request contains URL (Uniform Resource Locator) of "Java Virtual Machine" link activated by ZHANG SAN and relevant parameter of such link. Recorder/Player (21) will add such request to Record Object, and then send such request to Web Application means (22). The response code sequence as the processed result by Web Application means (22) will be added to Record Object. So in this step, what is recorded to Record Object shall be:

```
--CLIENT REQUEST-----------------------------------------------------------------------
GET
/ibm/console/com.ibm.ws.console.servermanagement.forwardCmd.do?forwardName=JavaVirtua
lMachine.config.view&sfname=jvmEntries&lastPage=ProcessDef.config.view&resourceUri=ser
ver.xml&parentRefId=JavaProcessDef_1188209145281&contextId=cells%3AIBM-BAC3A9012
40Node01Cell%3Anodes%3AIBM-BAC3A901240Node01%3Aservers%3Aserver1&perspectiv
e=tab.configuration HTTP/1.1
Host: 9.186.117.207:9060
User-Agent: Mozilla/5.0 (Windows; U; Windows NT 5.1; zh-CN; rv:1.8.1.6) Gecko/20070725
Firefox/2.0.0.6
Accept:
application/x-shockwave-flash,text/xml,application/xml,application/xhtml+xml,text/html;q=0.9,t
ext/plain;q=0.8,image/png,*/*;q=0.5
Accept-Language: en-us,zh-cn;q=0.5
Accept-Encoding: gzip,deflate
Accept-Charset: gb2312,utf-8;q=0.7,*;q=0.7
Keep-Alive: 300
Connection: keep-alive
Referer:
http://9.186.117.207:9060/ibm/console/com.ibm.ws.console.servermanagement.forwardCmd.do?
forwardName=ProcessDef.config.view&sfname=processDefinitions&lastPage=ApplicationServ
er.config.view&resourceUri=server.xml&parentRefId=ApplicationServer_1188209145281&serv
erRefId=Server_1188209145281&contextId=cells%3AIBM-BAC3A901240Node01Cell%3Ano
des%3AIBM-BAC3A901240Node01%3Aservers%3Aserver1&perspective=tab.configuration
Cookie: JSESSIONID=0000rnhAZow1ZCE2IIhhMDH4Qhx:-1; TJE=; TE3=N0:C N1:E N2:C
N3:C N4:C N5:C N6:C N7:C N8:C N9:C N10:C N11:C N12:C N13:C N14:C N15:C N16:C
N17:C N18:C N19:C N20:C N21:C N22:C N23:C N24:C N25:C
--SERVER RESPONSE------------------------------------------------------------------------
HTTP/1.x 200 OK
Content-Type: text/html; charset=ISO-8859-1
Content-Language: en-US
Transfer-Encoding: chunked
```

-continued

Date: Tue, 28 Aug 2007 05:22:25 GMT
Server: WebSphere Application Server/6.1 wherein the recorded Client request contains URL and parameter information of "Java Virtual Machine" link.

6) Then, the User ZHANG SAN activates "Run Time" link on the interface displayed on the Client with Web Application means (22), i.e. Interface of Java Virtual Machine page, and at the same time the Client will send corresponding request to Recorder/Player (21), and such request contains URL (Uniform Resource Locator) of "Run Time" link activated by ZHANG SAN and relevant parameter of such link. Recorder/Player (21) will add such request to Record Object, and then send such request to Web Application means (22). The response code sequence as the processed result by Web Application means (22) will be added to Record Object. So in this step, what is recorded to Record Object shall be:

wherein the recorded Client request contains URL and parameter of "Run Time" link.

7) Then, the User ZHANG SAN selects the checkbox of "detail of garbage collection" and then activates "OK" button on the interface displayed on the Client with Web Application means (22), i.e. Interface of Run Time page, and at the same time the Client will send corresponding request to Recorder/Player (21), and such request contains URL (Uniform Resource Locator) of such "OK" button and parameter. Recorder/Player (21) will add such request to Record Object, and then send such request to Web Application means (22). The response code sequence as the processed result by Web Application means (22) will be

```
-- CLIENT REQUEST  --------------------------------------------------------------------
GET /ibm/console/javaVirtualMachineDetail.do?EditAction=true&perspective=tab.runtime
HTTP/1.1
Host: 9.186.117.207:9060
User-Agent: Mozilla/5.0 (Windows; U; Windows NT 5.1; zh-CN; rv:1.8.1.6)
Gecko/20070725 Firefox/2.0.0.6
Accept:
application/x-shockwave-flash,text/xml,application/xml,application/xhtml+xml,text/html;q=
0.9,text/plain;q=0.8,image/png,*/*;q=0.5
Accept-Language: en-us,zh-cn;q=0.5
Accept-Encoding: gzip,deflate
Accept-Charset: gb2312,utf-8;q=0.7,*;q=0.7
Keep-Alive: 300
Connection: keep-alive
Referer:
http://9.186.117.207:9060/ibm/console/com.ibm.ws.console.servermanagement.forwardCmd
.do?forwardName=JavaVirtualMachine.config.view&sfname=jvmEntries&lastPage=Proces
sDef.config.view&resourceUri=server.xml&parentRefId=JavaProcessDef_1188209145281
&contextId=cells%3AIBM-BAC3A901240Node01Cell%3Anodes%3AIBM-BAC3A90124
0Node01%3Aservers%3Aserver1&perspective=tab.configuration
Cookie: JSESSIONID=0000rnhAZow1ZCE2IIhhMDH4Qhx:-1; TJE=; TE3=N0:C N1:E
N2:C N3:C N4:C N5:C N6:C N7:C N8:C N9:C N10:C N11:C N12:C N13:C N14:C N15:C
N16:C N17:C N18:C N19:C N20:C N21:C N22:C N23:C N24:C N25:C
-- SERVER RESPONSE  -----------------------------------------------------
HTTP/1.x 200 OK
Content-Type: text/html; charset=ISO-8859-1
Content-Language: en-US
Transfer-Encoding: chunked
Date: Tue, 28 Aug 2007 05:22:25 GMT
Server: WebSphere Application Server/6.1
``` added to Record Object. So in this step, what is recorded to Record Object shall be:

```
--CLIENT REQUEST-------------------------------------------------------------------------
POST /ibm/console/javaVirtualMachineDetail.do HTTP/1.1
Host: 9.186.117.207:9060
User-Agent: Mozilla/5.0 (Windows; U; Windows NT 5.1; zh-CN; rv:1.8.1.6) Gecko/20070725
Firefox/2.0.0.6
Accept:
application/x-shockwave-flash,text/xml,application/xml,application/xhtml+xml,text/html;q=0.9,text/plai
n;q=0.8,image/png,*/*;q=0.5
Accept-Language: en-us,zh-cn;q=0.5
Accept-Encoding: gzip,deflate
Accept-Charset: gb2312,utf-8;q=0.7,*;q=0.7
Keep-Alive: 300
Connection: keep-alive
Referer:
http://9.186.117.207:9060/ibm/console/javaVirtualMachineDetail.do?EditAction=true&perspective=tab.r
```

-continued

```
untime
Cookie: JSESSIONID=0000rnhAZow1ZCE2IIhhMDH4Qhx:-1; TJE=; TE3=N0:C N1:E N2:C N3:C
N4:C N5:C N6:C N7:C N8:C N9:C N10:C N11:C N12:C N13:C N14:C N15:C N16:C N17:C N18:C
N19:C N20:C N21:C N22:C N23:C N24:C N25:C
Content-Type:application/x-www-form-urlencoded
Content-Length: 58
action=Edit&verboseModeGarbageCollectionRuntime=on&save=OK
--SERVER RESPONSE------------------------------------------------------------------------------
HTTP/1.x 200 OK
Content-Type: text/html; charset=ISO-8859-1
Content-Language: en-US
Transfer-Encoding: chunked
Date: Tue, 28 Aug 2007 05:25:59 GMT
Server: WebSphere Application Server/6.1
``` wherein the recorded Client request contains URL and parameter corresponding to such "OK" button.

The User ZHANG SAN, upon completion such seven steps, will fulfill the garbage collection process to be recorded, so he activates "Stop Recording" button on the interface displayed on the Client with Web Application means (22). At the same time the Client (1) will send a corresponding request with a message of "Stop Recording" to Recorder/Player (21) which will stop writing-in, but write the Client-end request recorded in Record Object including the user name, password, URL and parameter of all links as well as each response code sequence as the processed result by Web Application means (22) together with sequence number of each step into Solution File (23) (or database, herein collectively called "Solution File" for uniformity) inside Storage means (24). In Solution File what is stated above can be recorded in a clear text.

In Solution File, the sequence numbers of abovementioned seven steps and said recorded request and response of each step can be recorded in correspondence. In light of what is contained respectively in said recorded request and response of each step, the Solution File contains information as follows:
1. User's basic information like the user name and password (e.g. abovementioned "ZHANG SAN" and "abc") for the purpose of identifying the owner of such Solution File.
2. Sequence number of all steps such as ID number, etc.
3. Information of each step.
wherein the information of each step includes:
1. URL of the request.
2. Type of the Request like GET, POST, HEAD, etc.
3. Parameters and the value of parameters of the request.
4. Response code sequence.

Then Web Application means (22) will return the interface used for input the name for such Solution File on the Client. The user will enter the name to such interface and Recorder/Player (21) will save such Solution File together with file name, for example the solution file is named as "garbage collection 1" in this example. Web Application means (22) will continue to process the user's request.

Figure 2:
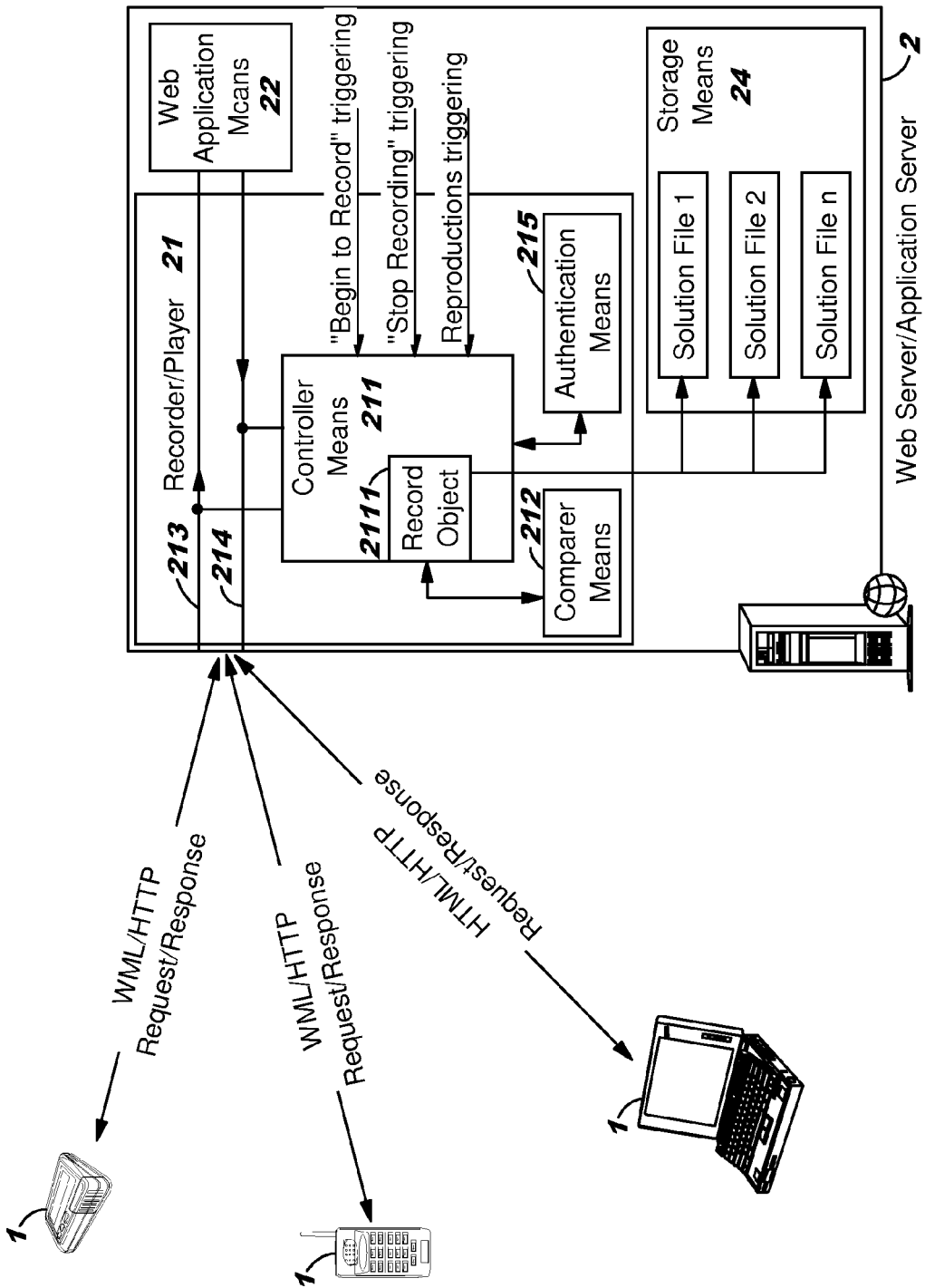
FIG. 2 is a Structural Block Diagram of System which is able to record/replay Web-based user steps indicating a demonstrative detail construction of a Recorder/Player based on Embodiment 1.

FIG. 2 is a Structural Block Diagram of System which is able to record/replay Web-based user steps indicating a demonstrative detail construction of Recorder/Player. As shown in such diagram, Recorder/Player (21) consists of: Request Data Line (213) for transmitting the request from the Client to Web Application means (22), Response Data Line (214) for transmitting the response from Web Application means (22) to the Client, and Controller means (211) for respectively coupling to Request Data Line (213) and Response Data Line (214) with "Begin to Record" triggering end and "Stop Recording" triggering end. When no event is triggered on "Begin to Record" triggering end, the device on the side of Controller means (211) does not work. Thus the request from the Client will be sent to Web Application means (22) through Request Data Line (213), while response from Web Application means (22) will be also sent back to the Client (which is equivalent to no record function available). When "Begin to Record" triggering end has input triggering of first event (e.g. abovementioned user's activating "Begin to Record" button, the Web Application means (22) is required to enable the interface displayed on the Client to include "Begin to Record" button, or e.g. the first event may be user's opening one file for five times or 10 minutes upon user's startup, which can be specified by Web Application means (22), generally fed back from Web Application means (22), i.e. Web Application means (22) has well defined what is the first event and then sees from the request from the Client whether any condition required for first event is met or not, if "yes", triggering of first event will be input to Controller (21), or however, manually done by the administrator on Server-side (e.g. there is a manual button on Controller means (211)), the recorder will begin to record the request from the Client on Request Data Line (213) and the response from Web Application means (22) corresponding to such request on Response Data Line (214); When "Stop Recording" triggering end has input triggering of second event (e.g. abovementioned user's activating "Stop Recording" button, the Web Application means (22) is required to enable the interface displayed on the Client to include "Stop Recording" button, or just as what is stated in Examples 5 and 6. For example in Example 5, in response to user's activating "Begin to Record" button, Web Application means (22) will inquire the user on the interface displayed on the Client how many steps to be taken as follows will be recorded, then return the interface back to the Client when the number (user input) of user steps are completed and then inform the user of the number (to be recorded) of steps has been recorded and inquire the user whether to continue recording subsequent steps, said second event being the user's choice of discontinuing to record sequent steps), the recorder will stop recording the request from the Client on Request Data Line (213) and the response from Web Application means (22) corresponding to such request on Response Data Line (214). That is to say, when there is a request from the Client on Request Data Line (213), once the first event is triggered on "Begin to Record" end, the request on Request Data Line (213) from the Client will flow into Controller means (211) and be recorded there (i.e. recorded to Record Object (2111)) while being sent to Web Application means (22), once the second event is triggered on "Stop Recording" end, record will be stopped, the recorded request and response in Record Object will be sent to Storage means (24) all together, where recorded as a Solution File.

In addition, Controller means (211) here also has a reproduction triggering end. When reproduction triggering is input on the reproduction triggering end (reproduction triggering is generally fed back by Web Application means (22), for example the user activates "reproduction" button on the interface displayed on the Client by Web Application means (22), which will send corresponding request to Web Application means (22). The Web Application means (22) determine that this is a reproduction request, and thus the Web Application means (22) will input a reproduction triggering to Controller means (211). Of course, such reproduction triggering can also be manually done by means of a manual button on Controller), the file name to be reproduced by the user will be contained in such reproduction triggering, and Controller means (211) will acquire the user steps file recorded corresponding to such file name from Storage means (24) once receiving the reproduction triggering containing such file name, and then transmit the Client request recorded in such file to Request Data Line (213) for delivering to the Web Application means (22). And then the response of Web Application means (22) will be sent to the Client by means of Response Data Line (214). On the other hand, such response may also flow to Controller means (211) and sent to Comparer means (212) connected with Controller means (211). And Comparer means (212) will compare such response with the response recorded in the corresponding user steps files recorded, and then return the result indicating whether such processed result is the same with the user's expectation back to the Client (1) (During recording, a desired and expected result is often recorded).

In addition, Controller means (211) has an authentication means (215). The reproduction triggering input on reproduction end also includes the user-input username and password. Authentication means (215) will compare the user-input username and password contained in reproduction triggering with the ones recorded in the recorded user steps file corresponding to such reproduction triggering; only in the case that both are the same, replay is available.

Client in FIG. 1 can be the one which is able to enable web function by means of present technology. Partial differences between this Server and the one with present technology lie in that first Web Application means (22) is capable of displaying "Begin to Record" button and "Stop Recording" button on the interface of the Client, and as stated below displaying list of recorded solutions on the interface of the Client, allowing the user to select one solution for replay and providing any other extended function; in addition, Recorder/Player (21) is plugged in front of Server, any request to Server must be transferred to Web Application means (22) only via Recorder/Player (21), and any response from Web Application means (22) must be transferred to the Client only via Recorder/Player (21). During such transfer, Recorder/Player (21) has played a role in recording request and response to Storage means (24), thus recording the user steps on Server-side. Thus such user steps can be replayed for the user if needed. Here Recorder/Player (21) and Storage means (24) are modules special to this Invention, which can be realized by those skilled in the art according to their functions described herein by means of software and hardware concerned.

Figure 6:
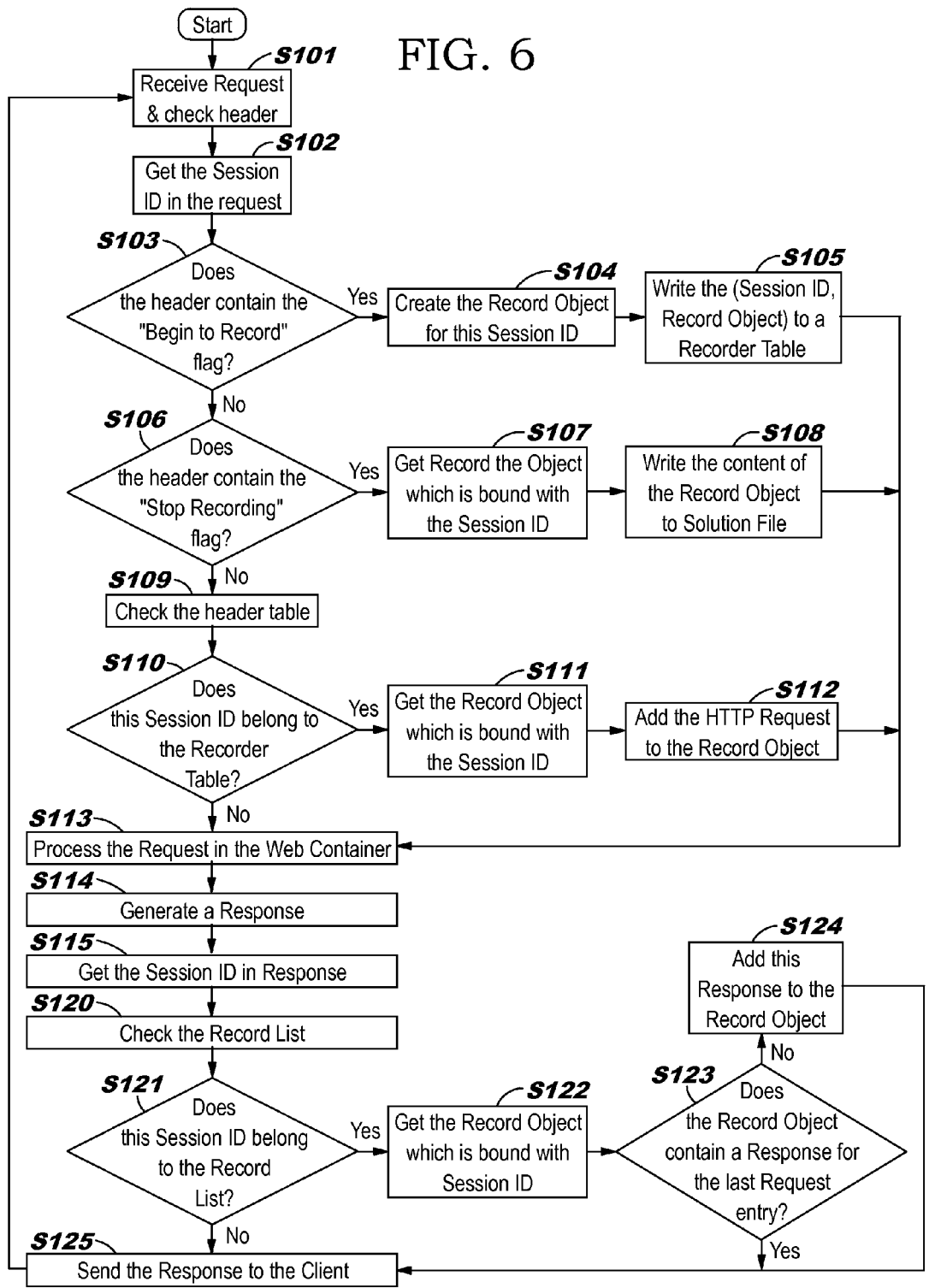
FIG. 6 is a Flowchart for recording user steps based on one example of this Invention.

FIG. 6 is a detailed flow diagram under this invention for record of user steps. The process is started from S101. At Step S101 Recorder/Player (21) will receive a request from the Client and check the request header. At Step S102 Recorder/Player (21) will obtain Session ID from such request. At Step S103 Recorder/Player (21) will judge whether "Begin to Record" flag is contained in the header of such request or not, if "yes", the process will pass to Step S104 creating Record Object for such Session ID, and at Step S105 write such (Session ID, Record Object) into Record List. It then passes to Step S113. If it is judged at Step S103 that no "Begin to Record" flag is contained, then judgment on whether "Stop Recording" flag is contained in the header or not will be performed at Step S106, if "yes" the process will pass to Step S107, where Record Object bound with such Session ID will be available. Then at Step S108, the detail of Record Object will be written into Solution File, and then Step S113 will continue. If it is judged at Step S106 that no "Stop Recording" flag is contained, then the process will pass to Step S109, where the record list will be checked. Then, a judgment on whether such Session ID belongs to the record list will be performed at Step S110. If "yes", Record Object bound with such Session ID will be taken out at Step S111. And then at Step S112, such request will be added to Record Object and the process will proceed to step S113. If it is judged at Step S110 that such Session ID does not belong to the record list, then such request will pass to Step S113 and be processed in Web Container. And then at Step S114 a response will be generated. At Step S115 the Session ID in such response will be taken out. At Step S120, the record list will be checked. At Step S121 the judgment on whether such Session ID belongs to the record list will be performed. If "yes", then Record Object bound with such Session ID will be taken out at Step S122. And at Step S123 whether such record object will contain any response to a request item will be determined. If "yes", the process will pass to Step S125, if "no", the process will pass to Step S124, where such request will be added to Record Object and then pass to Step S125. If it is judged at Step S121 that such Session ID does not belong to the record list, the process will directly go to Step S125, where such request will be sent to the Client and then the process will be back to Step S101.

Here the process to replay aforesaid recorded user steps on Server side is described. First of all, Web Application means (22) provides a "Browse Solution" button on the Client interface. Once the user has activated such button, Web Application means (22) will display the name list of Solution files stored in Storage means (24) on such interface. Then, the user enables to select one solution file name from the name list and activate "Replay" button, once receiving the request corresponding to the name of solution file the user has selected for replay, Recorder/Player (21) will find corresponding file from Solution Files (23) stored in the Server-side as per the file name, and get all requests and responses from such solution file in the order of recording, and then send these requests in turn to Web Application means (22) for processing. Then the response as the processed result by Web Application means (22) will be compared with the one taken out from such solution file and corresponding to such request. The compared result will show whether processed result is the same with user's expectation (i.e. the processed result occurred during recording user steps). Because the network conditions and web applications availability during recording and replaying could be different and thus different response results would likely occur, it is very necessary to return this compared result back to the Client for the user to judge whether the condition during replaying is the same with that during recording and to decide whether to continue this replay or not. So Recorder/Player (21) will return this compared result (i.e. result page) together with processed result of Web Application means (22) to the Client (1).

The user enables to replay the user steps from the Client of any kind (e.g. PC, Mobile Phone and PDA). This is because the replay mechanism is present in the Server side.

Figure 7:
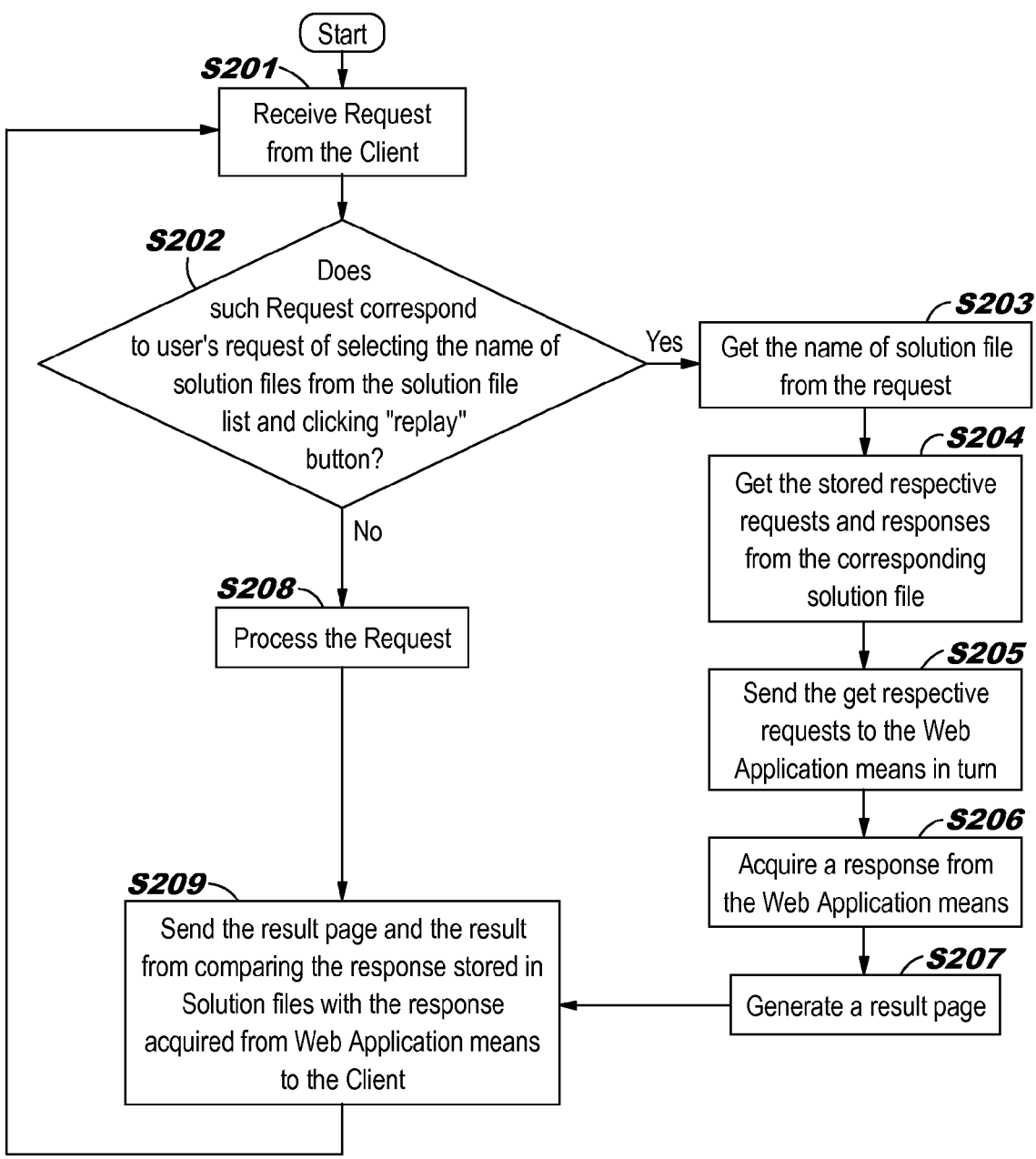
FIG. 7 is a Flowchart for replaying user steps based on one example of this Invention.

FIG. 7 is a flowchart to replay user steps under this Invention. The process is started from Step S201, where Recorder/Player (21) will receive a request from the Client (1). At Step S202, Recorder/Player (21) will judge whether such request is corresponding to the one for user to select solution file name from file list and activate "replay" button, if "yes", get the solution file name from such request at Step S203, get the stored request and response from the solution files corresponding to the name taken at Step S204, send every request taken to Web Container (i.e. Web Application) at Step S205, acquire response from Web Application at Step S206, generate result page at Step S207, and then enter into Step S209. If at Step S202 Recorder/Player (21) has judged that such request is not corresponding to the one for user to select solution file name from file list and activate "replay" button, then such request will be processed at Step S208, and then enter into Step S209 where the result for comparing the response on result page and stored in solution files with the one acquired from Web Application will be transmitted to the Client, and then back to Step S201.

Web Application means (22) will also display the interface of files for saving recorded user steps to be viewed by the user on the Client. Said files can be edited by the user on such interface. The user enables to browse the solution file on webpage and edit any solution files he/she or others create.

Embodiment 2

Figure 3:
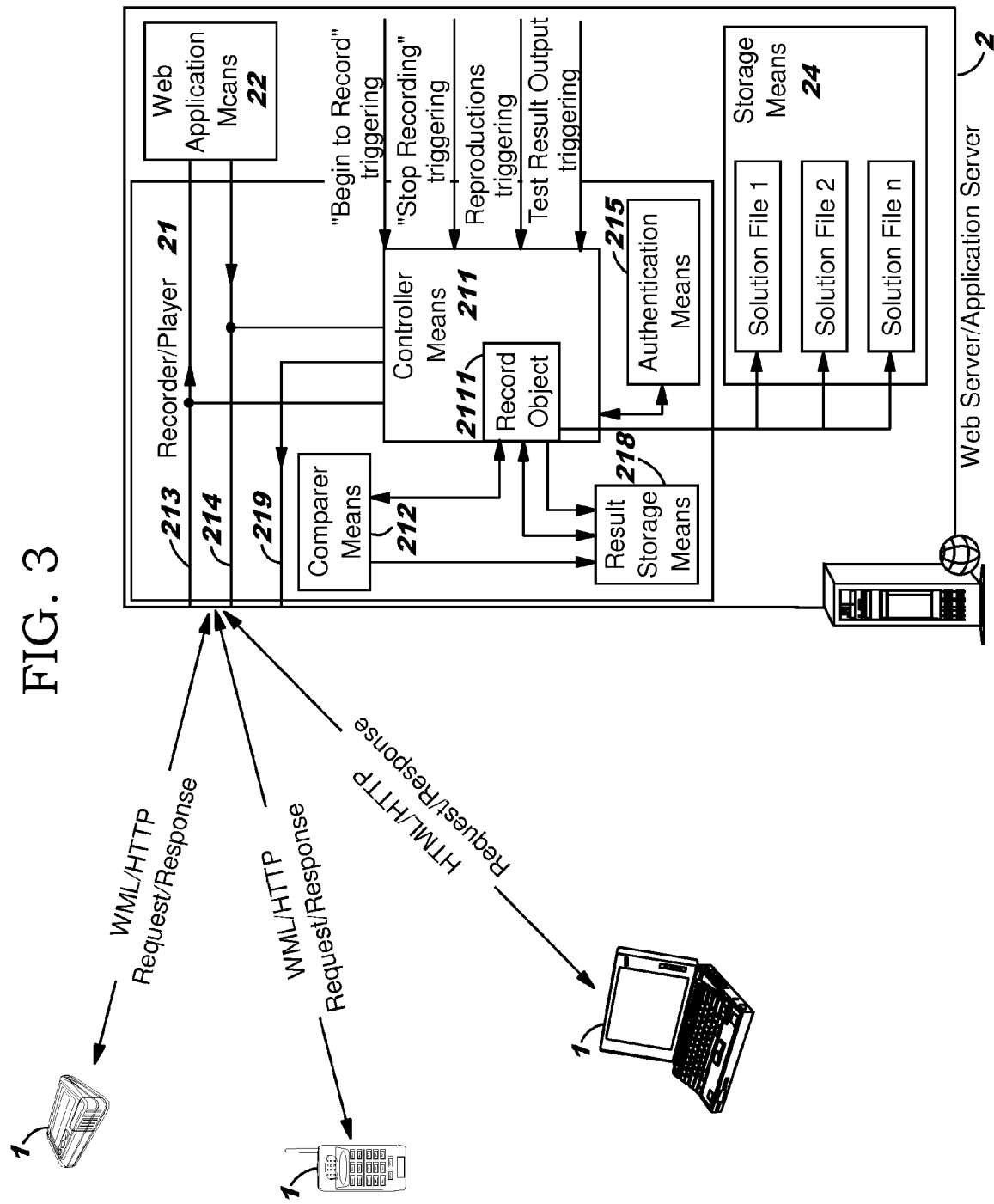
FIG. 3 is a Structural Block Diagram of System which is able to record/replay Web-based user steps indicating a demonstrative detail construction of a Recorder/Player based on Embodiment 2.

A very important application under this invention is in the field of testing, where what the testing user are concerned is not the kind of response from Web Application means (22) but whether the tested result is the same as his/her expectation, i.e. the result for comparing the response sent back from the Web Application means (22) once the specific request taken from the solution files stored in Storage during replaying is transmitted to Web Application means (22) with the one stored in such solution files and corresponding to such request. For example the test will last for a long period of time, so the user may want the machine to do a test during his/her off-duty and see the test result on the next morning instead of wasting time to wait. Then the user is not concerned about the response sent back from Web Application means (22) against the request of every step, but the result for comparing the response of every step with the one stored in the solution files and corresponding to the request of such step. In Embodiment 1, at the same time when the response from Web Application means (22) is sent back to the client, the result for comparing the response of such step with the one stored in the solution file and corresponding to the request of such step will also be sent to the Client. At that time the user has been off duty, so he/she has no time to see the comparative result. In Embodiment 2 a little improvement has been made. FIG. 3 is Structural Block Diagram of System which is able to record/replay Web-based user steps indicating a demonstrative detail construction of Recorder/Player based on Embodiment 2. In Embodiment 2, Recorder/Player (21) has been provided with Result Storage Unit (218) connected with Comparer means (212) and Controller means (211), a test result output triggering end is increased for the Recorder/Player, and a Feedback Line (219) for test result from Controller means (211) being fed back to the Client is also increased. For example when the user activates "reproduction triggering" button on the interface displayed on the Client with Web Application means (22), which will receive the request from the Client for response, and input "reproduction triggering" to the reproduction triggering end of Controller means (211), which will acquire corresponding user steps files recorded from Storage means (24), and then transmit the request from the Client and recorded in such file to Request Data Line (213) and sent to Web Application means (22), which will respond to such request and then send back the response via Response Data Line (214). Then the user has been off duty and has no time to see such response, which however is not what he/she is concerned about. On the other hand, Controller means (211) will acquire the response via Response Data Line (214) and then send such response together with the one stored in said solution file and corresponding to abovementioned request to Comparer means (212) for comparison. Comparer means (212) will store the comparative result in Result Storage (218). At this time Controller means (211) will not send such comparative result back to the Client directly but waiting "reproduction triggering". When the user is on duty the next morning he/she will activate the "test result display" button on the interface. Once receiving the corresponding request from the Client, Web Application means (22) will output test result output triggering to the test result output triggering end of Controller means (211), which will then call out the corresponding comparative result (i.e. list of comparative result of response of every step) from Result Storage (218), i.e. list of comparative result of response of every step, and return the list back to the Client via Feedback Line (219). In this way, the user can obtain the test result without waiting for the long test process.

Embodiment 3

Figure 4:
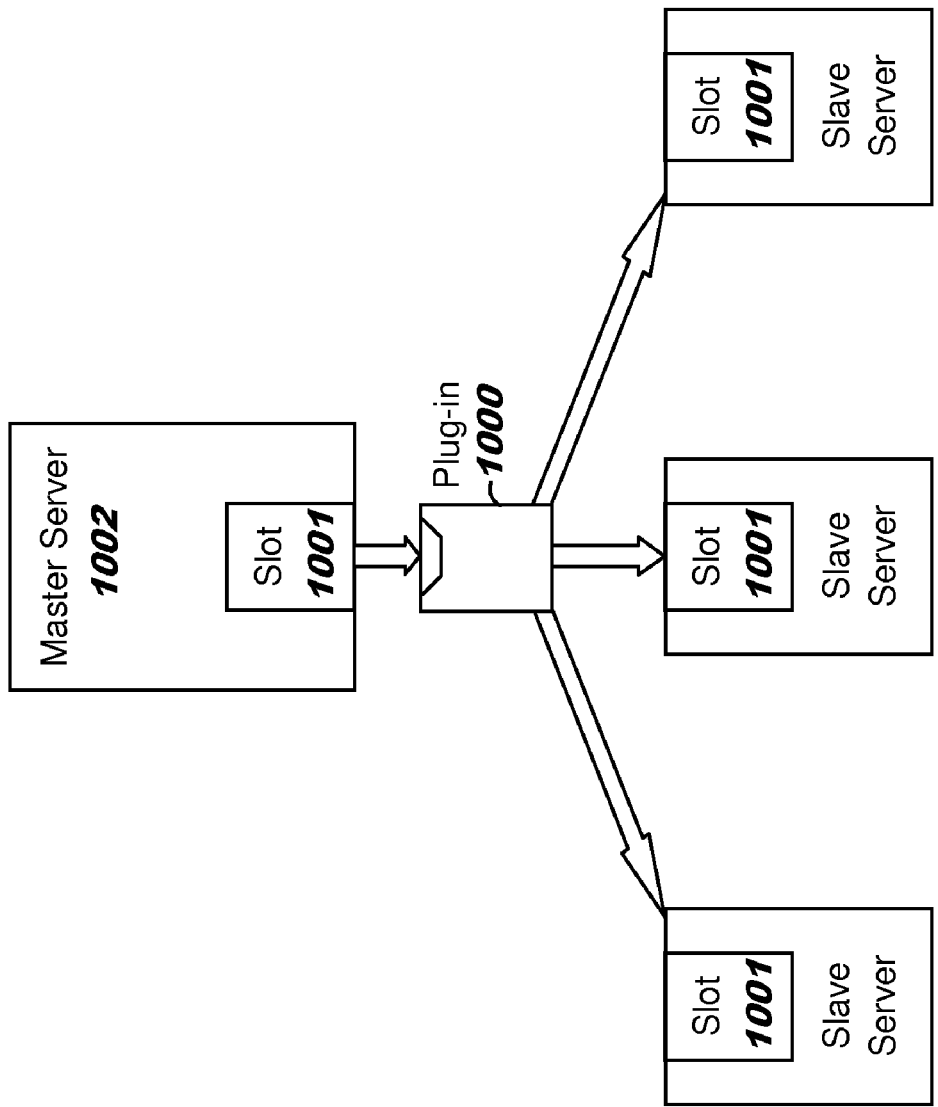
FIG. 4 is an illustration of a Server system based on Embodiment 3.
Figure 5:
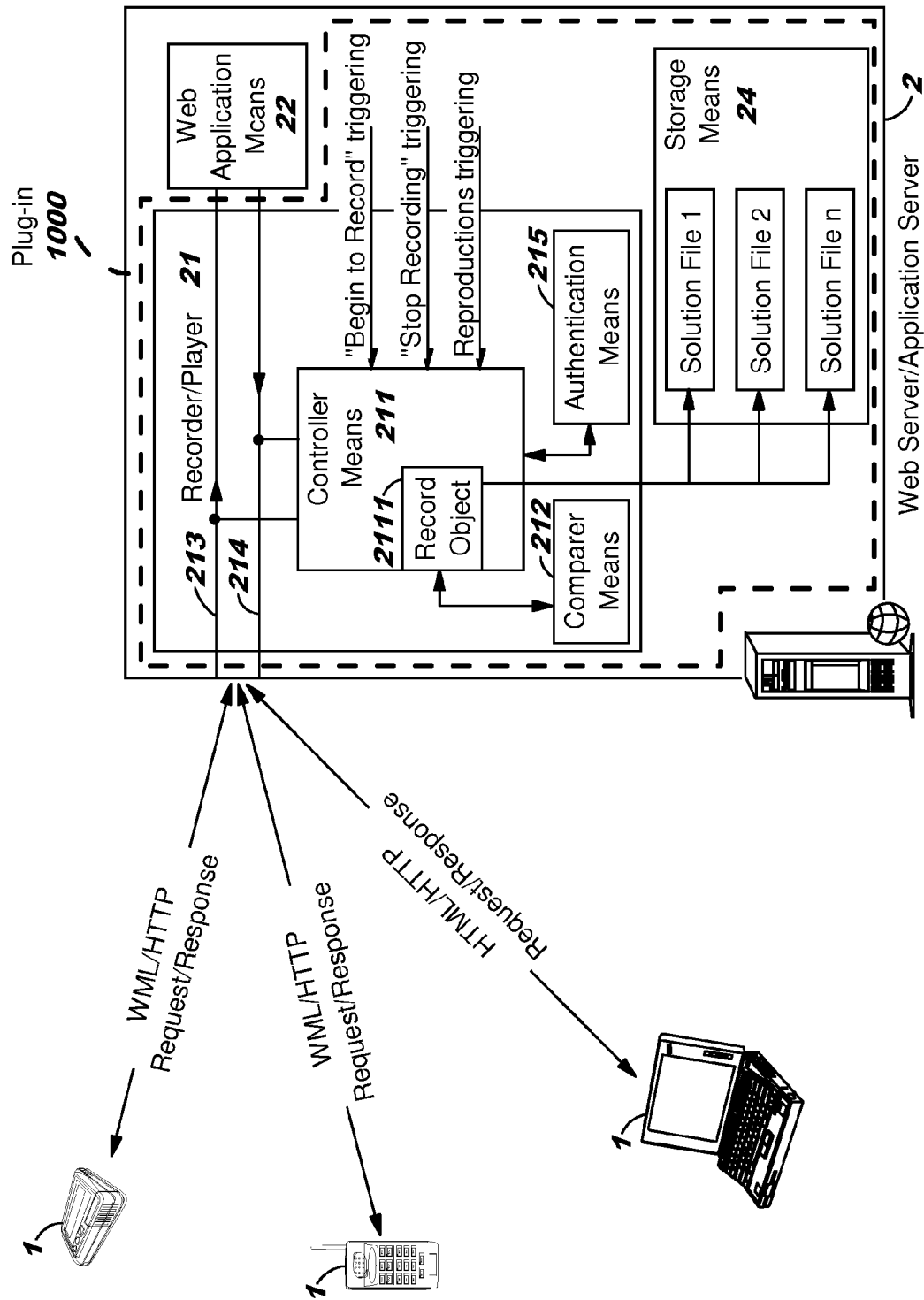
FIG. 5 is a Structural Block Diagram of System which is able to record/replay Web-based user steps indicating a demonstrative detail construction of a Recorder/Player based on Embodiment 3.

This Invention can be widely used in the field of installation and debugging of commercial software. Currently, specialists are required in the installation and debugging of some commercial software (e.g. financial software) available on market. However, for some highly complex commercial software, only a very small number of people know their installation and debugging, while once such software is sold each buyer must perform complicated installation and debugging. The present situation of technical force is hard to meet the demand. Embodiment 3 is just directed to such an issue. FIG. 4 is a schematic diagram of server system under Embodiment 3. FIG. 5 is a Structural Block Diagram of System which is able to record/replay Web-based user steps indicating a demonstrative detail construction of Recorder/Player based on Embodiment 3. In Embodiment 1 Recorder/Player (21) is only used as a plug-in, while in Embodiment 3 Recorder/Player (21) and Storage means (24) are combined as a plug-in (1000). The master server (1002) in FIG. 4 is set at the Producer of commercial software, and the slave server (1003) is set at the software buyer. Both master and slave servers are provided with slot (1001). At ex-work Plug-in (1000) will be inserted to Slot (1001) of Master server (1002). The installation and debugging specialist will record the steps necessary for installation and debugging to Storage means (24) of Plug-in (1000) by means as described above. When the commercial software is installed at the buyer, Plug-in (1000) will be inserted to Slot (1001) of Slave server (1003) at buyer's premises. Then what the user need do is to replay the steps to be taken by the installation and debugging specialist on the slave server with no participation of any specialist. Specific practice is similar to what is stated above. It is allowed to activate reproduction button on the client corresponding to Slave server (1003) for reproduction. Recorder/Player (21) in Plug-in (1000) will send every request for installation and debugging step recorded by specialist and stored in Storage means (24) in Plug-in (1000) to Web Application means (22)

on Slave server (1003) end, thus reproduction is available without participation of any specialist.

Embodiment 4

In Embodiment 4 under this invention, during the process that said user replays the recorded user steps, when the user selects one name of a solution file from the file name list and activates "replay" button, Recorder/Player (21) will not execute the steps of locating the corresponding solution file from Solution file (23) stored at Server side as per the file name for playing at once, but enable Web Application to return interface for the Client prompting the user to enter username and password. Only when such username and password are correct, i.e. the input username and password are the same with the ones stored in such solution file (e.g. "ZHANG SAN" and "ABC" in above case) (i.e. the ones of the user who creates such solution file to be replayed). (In the solution file the username of the user who creates such files is stored as aforesaid), can subsequent replay process can be carried forward. In this way service security can be improved, thus under this invention the recorded user steps can only be shared by the people who record them and their desired sharer so as to prevent any user unauthorized by the people who record the user steps from sharing them at discretion.

Other section of Embodiment 4 is similar to Embodiment 1, so no unnecessary detail is given herein.

Embodiment 5

In addition, this invention may not adopt such manner as used in Embodiment 1, i.e. beginning to record by means of activating "Begin to Record" button and stopping by means of activating "Stop Recording" button, but adopt the manner of recording the user steps number of which is selected by the user once the "Begin to Record" button is pressed down.

The specific process is as follows: when the user activates "Begin to Record" button displayed on the interface of the Client, Recorder/Player (21) will not begin to record subsequent user steps immediately, but enable Web Application means (22) to query the user on the query interface displayed on the Client about how many steps to be taken later shall be recorded, when the user enters the number of steps to be recorded, Recorder/Player (21) will begin to record the request sent corresponding to the subsequent steps the user will take and the response from Web Application means (22) against such request. Once the user steps with the user-input number are completed, i.e. the same number of requests and responses corresponding to said user steps have already been recorded, Recorder/Player (21) will inform the user on the client return interface that the user steps with number input has been recorded, and query the user whether to continue recording subsequent several number of steps, if yes, the user shall reenter the number of steps to be recorded, and Recorder/Player (21) will record the request and response corresponding to such number of subsequent steps till the user expresses that not continuing on page. At that time, the user's selecting not to continue is equivalent to the second event. Then all user steps recorded from the user's activating "begin to record" button till present shall be saved as a solution file (23).

Other section of Embodiment 5 is similar to Embodiment 1, so no unnecessary detail is given herein.

Embodiment 6

According to Embodiment 6, this invention may not adopt such manner as used in Embodiment 1, i.e. beginning to record by means of activating "Begin to Record" button and stopping by means of activating "Stop Recording" button, but adopt the manner of recording the user steps which are taken within a period of time selected by the user once the "Begin to Record" button is pressed down.

The specific process is as follows: when the user activates "Begin to Record" button displayed on the Client interface, Recorder/Player (21) will not begin to record the subsequent user steps immediately, but enable Web Application means (22) to query on the return query interface on the Client the user about the time span as of "Begin to Record" button being pressed down within which steps to be taken later shall be recorded, when the user enters the expected time span, Recorder/Player (21) will begin to record the request sent corresponding to the subsequent steps the user will take and the response from Web Application means (22) against such request. Once the user-input time span is elapsed, Recorder/Player (21) will pause and inform the user on client return interface that the user steps to be taken within the input time span has been recorded, and query the user whether to continue any more time span. If yes, the user shall reenter another time span, and Recorder/Player (21) will record the request and response corresponding to the steps to be taken within such input time span till the user expresses not continuing on page. The user's selecting not to continue is equivalent to the second event. Then all user steps recorded from the user's activating "begin to record" button till present shall be saved as a solution file (23).

Other section of Embodiment 6 is similar to Embodiment 1, so no unnecessary detail is given herein.

Embodiment 7

According to Embodiment 7, this invention may not adopt such manner as used in Embodiment 1, i.e. beginning to record by means of activating "Begin to Record" button and stopping by means of activating "Stop Recording" button, but adopt the manner that the user activates "Begin to Record" button and executes the user steps and if the user pauses unexecuted user steps within scheduled time span then Recorder/Player will query the user on return interface whether the user wants to save currently recorded user steps as a solution file.

The specific process is as follows: when the user activates "Begin to Record" button displayed on the Client interface, Recorder/Player (21) will begin to record the subsequent user steps. at that time Recorder/Player (21) shall count time interval between occurrences of two consecutive steps, if the user pauses unexecuted user steps within scheduled time span, the user steps sequence has been likely completed, Web Application means (22) will return the interface back to the client and query the user whether the user wants to save currently recorded user steps as a solution file. The user's thus selecting to save all currently recorded user steps as a solution file is equivalent to the second event. If the user does want to save at this point, Recorder/Player (21) will save all user steps executed from the user's activating "begin to record" button till present as a solution file. If the user does not want to save at this point, Recorder/Player (21) will continue recording the user steps for the user till that the user pauses any unexecuted user steps within scheduled time span again and thus will be queried again or the user has activated "stop recording" button.

Other section of Embodiment 7 is similar to Embodiment 1, so no unnecessary detail is given herein.

Embodiment 8

In Embodiment 8, during replay of user steps Web Application means (22) will classify the names in the name list previously stored in Storage displayed on the Client. One classifying method is based on the username of solution file creator (i.e. the user who records such solution file), the solution files created by one user will be displayed in the same category; another classifying method is based on the category of solution file, which can be designated and input by the user on interface when entering the solution file name. This Embodiment is particularly effective when the user has created a large number of solution files. In case that there are a large number of solution files, if the solution files are not classified and displayed, much information will be available for users' selection, the efficiency for finding cannot be easily improved.

Other section of Embodiment 8 is similar to Embodiment 1, so no unnecessary detail is given herein.

Embodiment 9

In Embodiment 9, during replay of user steps Web Application means (22) will sort and display the solution files based on the previous replay frequency when displaying the name list of solution files previously stored in Storage on the Client. Such sequence is from high frequency to low. This Embodiment manner requires Web Application means (22) or Recorder/Player (21) to be provided with frequency statistic function to count frequency of every solution file's being replayed. This embodiment enables the user to know clearly which solution files are shared with high extent and which are shared with low extent.

Other section of Embodiment 9 is similar to Embodiment 1, so no unnecessary detail is given herein.

Embodiment 10

Under this invention Web Application means (22) will offer an interface to view created solution files which can be edited by the user on such interface. In Embodiment 10 on edit interface several solution files can be integrated into one. Thus when the integrated solution file is replayed, which will be replayed one by one in the order of integration.

Other section of Embodiment 10 is similar to Embodiment 1, so no unnecessary detail is given herein.

Embodiment 11

The difference between Embodiment 11 and Embodiment 1 lies in that: in Embodiment 11 when Recorder/Player (21) receives the request sent from the Client and generated due to the user's activating "begin to record" button, only records the request from the client upon abovementioned request instead of correspondingly recording the response from Web Application means (22) against such request, while during the user steps replay, in response to user's choice in name list of solution files displayed, Recorder/Player (21) will get requests for storage in turn from the solution files corresponding to the file names selected, and send these requests to Web Application means (22) in turn, and then return the processed result by Web Application means (22) back to the Client (1). It is unnecessary and has no means to compare the response as actual processed result by Web Application means (22) with the one stored by Solution Files (23) since there is no response corresponding to abovementioned request is stored in the solution file, thus the process to return comparative result to the Client (1) will be canceled. Embodiment 9, although cannot enable the user to know whether the result of actually replaying the user steps is the same with what is expected, i.e. the same with the situation when recording user steps, can also perform the action of replaying the user steps recorded. Embodiment 2 is mainly applicable for the situation that the user is interested in the comparative result between responses instead of the responses per se. Embodiment 11 is mainly applicable for the situation that the user is interested in the responses per se instead of the comparative result between responses.

It should be understood that said Embodiments are just for illustration and are not exhaustive. Various modification and variance of the above embodiments can be made by those skilled in the art without departing from the spirit and essence of the present invention. These modification and variance all fall into the protection scope defined by the claims of the present invention.

The invention claimed is:

1. A recorder/player of user-input instructions to a Web application, the recorder/player comprising:
    a request data line for transmitting a request from a client to Web application means in a server wherein the request initiates a recording of user-input instructions to a Web application in order to create a recorded set of user-input instructions to the Web application;
    a response data line for transmitting a response from the Web application means in the server to the client, wherein the response indicates that recording of the user-input instructions to the Web application has been enabled;
    controller means for controlling execution of a "Begin to Record" trigger and a "Stop Recording" trigger that respectively begin and stop the recording of the user-input instructions to the Web application; and
    comparer means for comparing a predefined result from execution of the recorded set of user-input instructions to the Web application with a first user-expected result for execution of the recorded set of user-input instructions to the Web application, and for comparing a second predefined result of each user-input instruction with a second user-expected result for executing said each user-input instruction from the recorded set of user-input instructions to the Web application, and wherein the comparer means returns a message to the user indicating whether or not the first predefined result and the first user-expected result are a same result.

2. A recorder/player according to claim 1, wherein the Web application means enables an interface displayed on the client to include a "Begin to Record" button, wherein said user activating the "Begin to Record" button begins said recording of user-input instructions, and wherein the Web application means enables the interface displayed on the client to include a "Stopping Record" button, wherein said user activating the "Stopping Record" button stops said recording of user-input instructions.

3. A recorder/player according to claim 2, wherein a record object is created by the client activating the "Begin to Record" button and the "Stopping Record" button.

4. The recorder/player of claim 1, further comprising:
    the controller means recording a seven-step garbage collection routine that comprises the user-input instructions to the Web application.

5. The recorder/player of claim 1, further comprising:
    the controller means receiving an instruction to limit said recording of user-input instructions to the Web application to a user-defined quantity of user-input instructions; and
    the controller means limiting said recording of user-input instructions to the Web application to the user-defined quantity of user-input instructions.

6. The recorder/player of claim 1, further comprising:

the controller means receiving an instruction to limit said recording of user-input instructions to the Web application to a user-defined length of time from when the client sent the request; and the controller means limiting said recording of user-input instructions to the Web application to the user-defined length of time from when the client sent the request.

7. A server method for recording Web-based user steps comprising:

displaying a Web interface to a client, wherein user's actions on the Web interface comprise user-input instruction to a Web application;

in response to receiving, on the server side, a request from the client to record user-input instructions to the Web application, recording the user-input instructions to the Web application in order to create a recorded set of user-input instructions to the Web application;

displaying to the client a name list of flies in which previously recorded user-input instructions are saved;

comparing a first predefined result from executing the recorded set of user-input instructions to the Web application with a first user-expected result for executing the recorded set of user-input instructions to the Web application;

comparing a second predefined result of each user-input instruction with a second user-expected result for executing said each user-input instruction from the recorded set of user-input instructions to the Web application;

returning a message to the user indicating whether or not the first predefined result and the first user-expected result are a same result; and debugging the Web application by correcting errors in the Web application that caused the first predefined result to differ from the first user-expected result.

8. The server method according to claim 7, further comprising:

enabling the interface displayed on the client to contain a "Begin to Record" button;

beginning to record Web-based user steps in response to thee user's activating "Begin to Record" button;

enabling an interface displayed on the client to contain a "Stop Recording" button; and stopping recording Web-based user steps in response to the user's activating the "Stop Recording" Button.

9. The server method according to claim 8, further comprising:

creating a record object of the user-input instructions to the Web application in response to the client activating the "Begin to Record" button and the "Stopping Record" button.

10. The server method according to claim 1, wherein the recorded set of user-input instructions comprises non-media files.

11. The server method of claim 7, further comprising:

recording a seven-step garbage collection routine that comprises the user-input instructions to the Web application.

12. The server method of claim 7, further comprising:

receiving an instruction to said recording of user-input instructions to the Web application to a user-defined quantity of user-input instructions; and limiting said recording of user-input instructions to the Web application to the user-defined quantity of user-input instructions.

13. The server method of claim 7, further comprising:

receiving an instruction to limit said recording of user-input instructions to the Web application to a user-defined length of time from when the client sent the request; and limiting said recording of user-input instructions to the Web application to the user-defined length of time from when the client sent the request.

14. The server method of claim 7, further comprising:

classifying the recorded set of user-input instructions.

15. The server method of claim 14, further comprising;

basing said classifying of the recorded set on a name of the user.

16. The server method of claim 7, further comprising:

displaying a frequency of how often the recorded set is called for execution by the user.

\* \* \* \* \*